United States Patent [19]

Crotts et al.

[11] Patent Number: 4,872,238
[45] Date of Patent: Oct. 10, 1989

[54] VEHICLE TREATMENT APPARATUS

[75] Inventors: Lonnie Crotts, Summerfield; Thomas W. Meadows, Providence, both of N.C.

[73] Assignee: Bivens Winchester Corporation, Danville, Va.

[21] Appl. No.: 98,952

[22] Filed: Sep. 21, 1987

[51] Int. Cl.$^4$ ............................................. B60S 3/04
[52] U.S. Cl. ..................... 15/302; 15/312 A; 15/316 R; 15/379; 34/243 C; 239/244; 239/602; 239/DIG. 19
[58] Field of Search ............... 15/302, 312 R, 316 R, 15/405, DIG 2, 408, 414, 53 A, 53 R; 134/123; 34/229, 243 C; 239/DIG. 19, DIG. 21, 602, 243, 244, 246

[56] References Cited

U.S. PATENT DOCUMENTS

| | | | |
|---|---|---|---|
| 2,392,085 | 1/1946 | Ferrel | 239/DIG. 19 |
| 3,263,341 | 8/1966 | Allen | 34/60 |
| 3,391,701 | 7/1968 | Richardson et al. | 239/243 |
| 3,431,580 | 3/1969 | Cirino et al. | 15/302 |
| 3,877,107 | 4/1975 | Cirino | 15/302 |
| 3,903,562 | 9/1975 | Miles | 15/312 R |
| 3,994,041 | 11/1976 | Barber | 15/302 |
| 4,161,801 | 7/1979 | Day et al. | 15/DIG. 2 |
| 4,418,422 | 12/1983 | Day et al. | 15/312 A |
| 4,470,167 | 9/1984 | Bivens | 15/53 AB |
| 4,622,714 | 11/1986 | Tomasello | 15/316 R |
| 4,685,169 | 8/1987 | Nelson | 15/302 |

*Primary Examiner*—Chris K. Moore
*Attorney, Agent, or Firm*—Krass & Young

[57] ABSTRACT

Vehicle drying apparatus for use in either roll-over, drive-through, or tunnel type car washing installations. The dryer comprises an air plenum tube which extends overhead and transversely of the drying location and has a plurality of air outlet nozzles, the angular orientations of which relative to a vehicle being dried is subject to alteration. Means are provided for pivoting the nozzles transversely of the vehicle and, in the case of the roll-over washer, reaiming the nozzles so as to constantly direct air in a forward direction regardless of the direction of movement of the gantry frame relative to the vehicle.

25 Claims, 4 Drawing Sheets

VEHICLE TREATMENT APPARATUS

INTRODUCTION

This invention relates to apparatus for cleaning automotive vehicles and the like and more particularly to an apparatus for drying a wet vehicle by directing high velocity air onto the surfaces of the vehicle after it has been washed.

BACKGROUND OF THE INVENTION

Retail vehicle washing services and the fabrication and sale of apparatus for performing vehicle washing and drying services have both become multimillion dollar businesses in the United States. Automatic and semi-automatic car washers essentially are of two types: the first is the so-called "tunnel washer" wherein a vehicle is rolled through a longitudinally spaced series of machines which wet, wash and rinse the vehicle and thereafter remove rinse water by high velocity air, vehicle contacting drying materials and/or a combination of the two; the second class of apparatus is termed a "rollover washer" and typically involves a gantry frame supported on rails for translating back and forth over a parked vehicle, again to perform wetting, washing and rinsing operations. There is, in fact, a third type which is a hybrid of the two mentioned types called a "drive through" washer. This may, for example, be a rollover washer with stop and go signals to direct the driver how and when to position his vehicle relative to the washer and when to drive throught the washer.

Whatever the type of washer, an important factor in the customer's perception of the quality of the washing service is the degree to which the vehicle is dried after the washing and rinsing operations. Air blowers, to perform effectively, require a properly directed high velocity air stream. Moreover, because air velocity tends to dissipate rapidly after the air leaves the blower outlet, it is highly desirable to place the outlet as close to the vehicle surfaces as possible, and to aim the airstream to most effectively remove water from the vehicle.

SUMMARY OF THE INVENTION

The present invention is a dryer apparatus for use in combination with or as a supplement to a vehicle washing and rinsing system, and is compatible with tunnel, drive-through and rollover type washers. In general the apparatus of the invention comprises means defining an elongate air plenum, support means securing the plenum transversely of and over a vehicle drying location, means such as a turbine for supplying air to the plenum, and a plurality of air outlet nozzles each having a length which is a multiple of its diameter, connected to and spaced along the plenum for receiving air from the plenum and directing the air downwardly toward a wet vehicle in the drying location.

In the preferred form the apparatus further comprises means, which may take various forms, for altering the angularity of the nozzles during the drying operation to increase the effectivity and the coverage of the drying function. In one illustrative form the nozzles are susceptible of transverse pivotal movement or oscillation, preferably in ganged or unison relationship with one another. In another form hereinafter described, particularly useful in connection with a rollover washer which reverses direction of movement relative to the stationary vehicle, the nozzles are also susceptible of both forward and rearward angulation, the sequence of movement being such as to angle the nozzles forwardly in the direction of air flow regardless of the direction of movement of the gantry frame relative to the vehicle. In this fashion air is always pushed forwardly in advance of the nozzle. Means for preventing water drippage from the air plenum tube and rollover frame onto a previously washed vehicle during the drying process are also provided.

DETAILED DESCRIPTION OF THE ILLUSTRATIVE EMBODIMENTS

Referring now to FIGS. 1–5 the first embodiment of the invention is a rollover washer of the type used to automatically or semi-automatically wash and dry a vehicle which is parked in a treatment location. This type of washer/dryer combination is typically used where installation space is at a premium.

The apparatus which embodies the invention comprises a gantry frame 10 constructed of square section metal tubing and mounted on trolley rails 12 by means of wheels 14 at least one of which is connected to be directly driven by an electric motor 16 through appropriate gearing to propel the gantry frame 10 forwardly and rearwardly along the tracks 12. It will be understood by those familiar with rollover washers that the tracks 12 straddle the vehicle treatment location and run parallel to the longitudinal axis of the vehicle. Moreover the gantry frame 10 is constructed in the form of an inverted U having left and right vertical support sections which lie on opposite sides of the vehicle treatment location and are spaced far enough apart to accommodate a vehicle therebetween. In addition the gantry frame 10 comprises a bridge portion which crosses between the side sections overhead of the vehicle washing location and high enough to safely pass over the top of the vehicle to be washed and dried as well as to accommodate the additional apparatus hereinafter described. Such a gantry frame construction is shown, as adapted for stationary operation, in FIG. 6 and is more fully disclosed in U.S. Pat. Nos. 4,593,425 issued May 10, 1986 and 4,470,167 issued Sept. 11, 1984, the disclosures of said patents being incorporated herein by reference.

Figure 1:
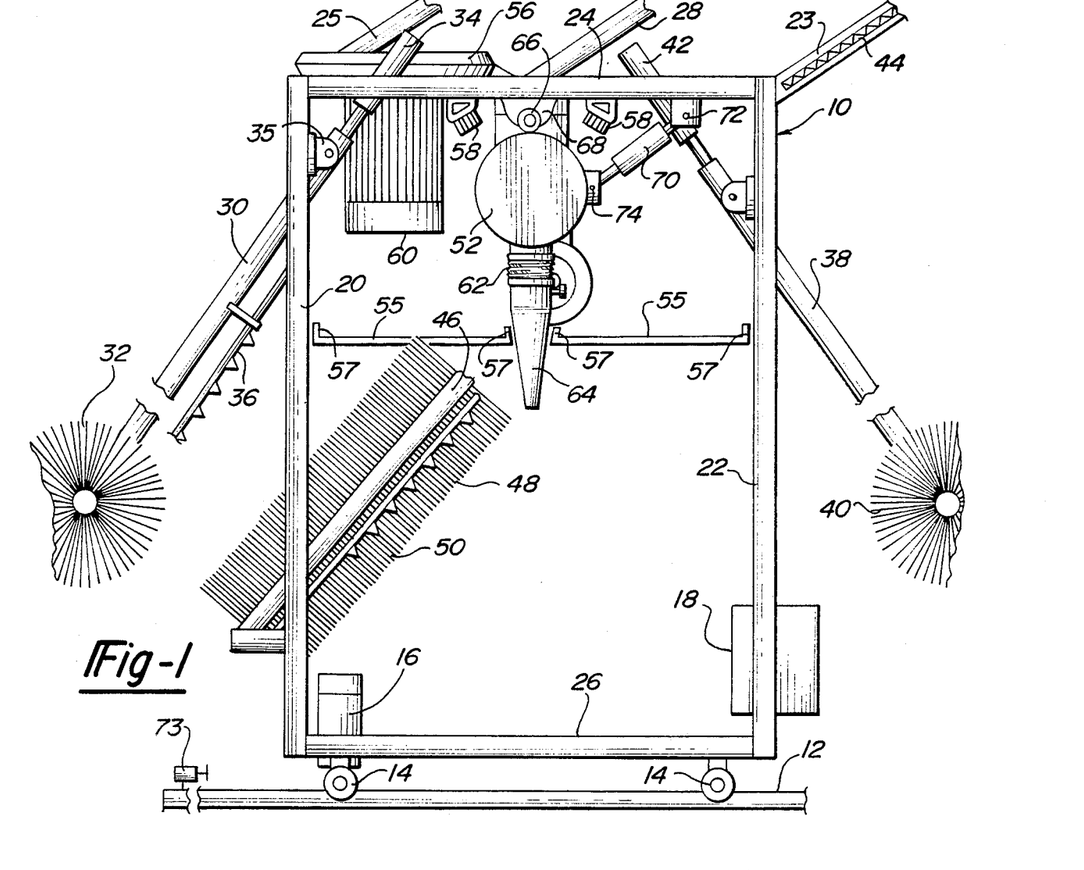
FIG. 1 is a side view of a rollover washer incorporating the invention, further illustrating a perspective view of the transverse cross beams of the rollover washer.
Figure 2:
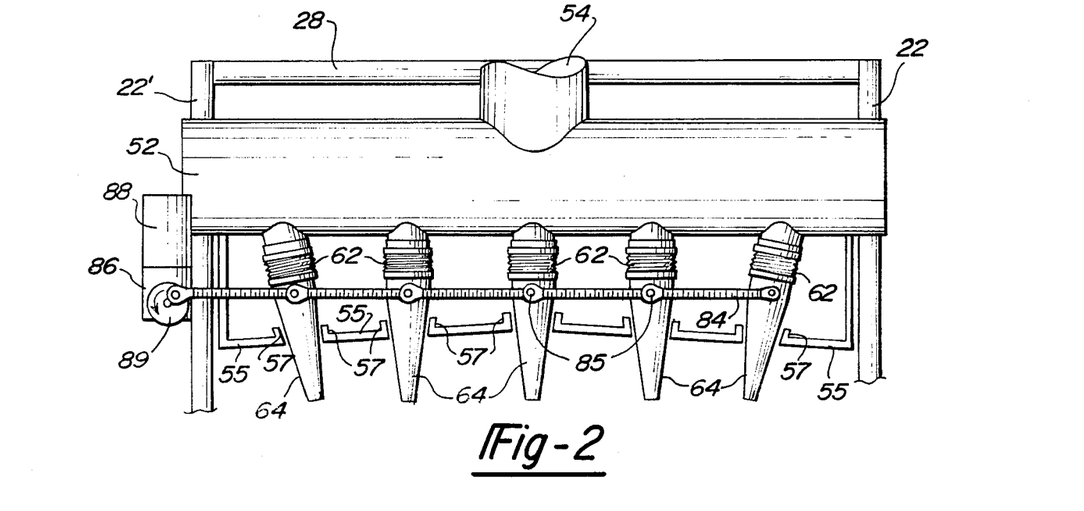
FIG. 2 is a front view of a multiple nozzle plenum from the apparatus of FIG. 1.

The gantry frame 10 shown in FIGS. 1 and 2 comprises vertical structural beams 20 and 22 tied together at the top by longitudinal cross beam 24 and at the bottom by longitudinal cross beam 26. Transverse cross beams 23 and 25 connect the left and right vertical support sections. More than one transverse cross beam may alternatively be used at each end to give added support to the gantry frame 10 and provide additional mounting area for various components of the embodiment. Motor 16 is mounted on cross beam 26 over either of wheels 14 for reversibly driving wheel 14 under the control of a programmable controller 18 which is shown in FIG. 1 mounted on the vertical beam 22 but which may alternatively be mounted some distance away from the gantry frame 10 and connected to the rollover washer components by way of cables having appropriate waterproof covers. As shown in FIG. 2, a similar rectangular gantry frame vertical section 22' is disposed at the opposite lateral side of the frame 10 and is connected to the frame section described immediately above by means of transverse cross rails 28.

To wash a vehicle in the treatment location, frame 10 carries a first spaced-apart pair of horizontal brush support arms 30 carrying between the ends thereof a rotary brush 32 which is counterbalanced by weight 34. Pivots 35 permit the brush 32 to be raised and lowered to cover the horizontal surfaces of a vehicle being washed as it more fully disclosed in the aforementioned U.S. Patents incorporated herein by reference. Arms 30 carry water spray tubes 36 having nozzles which are directed at the vehicle treatment location to wet the vehicle prior to the application of the brush 32.

A similar set of brush support arms 38 is mounted at the opposite longitudinal end of the frame 10 to carry a second horizontal brush 40 which is balanced by counterweight 42. The positions of the arms 30 and 38 are controlled by means of air cylinders through the sequence controller 18. It is of particular advantage to utilize two oppositely-extending, pivotally-connected horizontal brushes such as 32 and 40 in a rollover washer/dryer to maximize the effective coverage of the vehicle during the washing operation, especially the grill section, front bumper, rear deck and lower rear bumper sections of the automobile being treated. The brush arms 30, 38 are raised and lowered as the frame 10 rolls fore and aft and there is no need to reverse the direction of brush rotation. A spray tube 44 having inwardly directed nozzles is connected to the transverse cross beam 23 for wetting the vehicle as previously described. The nozzles are directed at such an inward angle to permit wetting the vehicle while avoiding wetting the plenum tube 52 or the drip-shield 55 as will be hereinafter described.

Gantry frame 10 also carries side brushes 48 mounted on pivotal arms 46 which are structurally connected to the vertical beams 20 and 22 as is more fully described in U.S. Pat. No. 4,593,425. The arms 46 are pivotally mounted so as to swing inwardly and outwardly to accommodate vehicles of various widths. Spray tube 50 having inwardly directed nozzles is provided for wetting the vehicle.

For drying a vehicle which has been washed by means of the apparatus described immediately above, frame 10 carries therewith a large galvanized steel cylindrical plenum tube 52 which is disposed transversely across and over the vehicle treatment location; i.e., the plenum tube 52 runs parallel to the transverse cross beams 28 and is sufficiently high in its location as to clear the top surface of a vehicle to be washed and dried by a generous margin. Plenum tube 52 is approximately 10 inches in diameter and approximately 7 to 8 feet wide; i.e., preferably wider than the normal width of a vehicle to be treated for purposes hereinafter described. Although galvanized steel is preferred, other materials such as aluminum or synthetic polymers may be used to make tube 52.

As shown in FIGS. 1 and 2 plenum tube 52 has connected therewith a large diameter central supply conduit 54 which is connected by means of flexible piping to a turbine 56 driven by motor 60 which is mounted on the frame 10 in the upper bridge section.

Spaced longitudinally along the plenum tube 52; i.e., spaced transversely of the vehicle to be treated, are air outlet structures 62 which are aimed generally downwardly to direct high velocity air streams at a vehicle in the treatment location beneath and within the gantry frame 10. Conical nozzles 64 of soft flexible material such as canvas or polymeric material, and having a venturi-like configuration are connected to each of the air outlet structures 62 for increasing air velocity and for reducing or eliminating the risk of damage to a vehicle due to contact between the air outlet nozzles and the painted surfaces of the vehicle; i.e., through the use of conical fabric nozzles 64 which are soft and flexible and which will not damage the painted surfaces of the vehicle, the air outlets may be brought very close to the vehicle thereby to maximize air velocity and the effectiveness of the drying or waterstripping operation with a minimum horsepower motor while at the same time reducing or eliminating the risk that a vehicle of irregular height may actually contact the air outlet structure and either damage the vehicle or the structure itself. The length of each of the nozzles 64 can be seen to be a multiple of its diameter. Any of a large number of fabric or fabric-like materials such as plastic-impregnated canvas may be used to construct the conical nozzles 64.

A drip shield 55 lies beneath the plenum tube 52 and transverse cross beams 23, 25, and 28 to prevent water which may condense or collect on the plenum tube or cross beams while the vehicle is being washed from dripping onto the vehicle as it is being dried. Drip shield 55 comprises two planar halves joined in a shallow, inverted V-shape with openings at their junction through which outlet structures 62 and nozzles 64 protrude. The openings are of sufficient size to allow both the changing of the angular orientation of the plenum tube 52 (as will be hereinafter described) and the altering of the angular orientation of outlet structures 62 and nozzles 64 relative to plenum tube 52, without damage to the nozzles occasioned by contact with the sides of the openings. Raised flanges 57 are formed along the front and back edges of drip shield 55 and around the periphery of the drip shield openings. The side edges of drip shield 55 running parallel to the direction of motion of the rollover washer have no flanges formed thereon. Drip shield 55 is disposed above and adjacent the vehicle treatment location, mounted to transverse cross beams 23, 25 and 28. Water dripping from plenum tube 52 or the transverse cross beams is deflected by drip shield 55 to roll off its side edges positioned on either side of the vehicle treatment location. Flanges 57 prevent water from dripping from either the openings or the front and back edges of drip shield 55.

To alter the angular orientation of the nozzles 64 relative to the vehicle being treated in the course of drying or waterstripping operation, the plenum tube 52 is connected to the upper structure of the gantry frame 10 by means of left and right pivots 66 which are connected to brackets 68 welded to the transverse cross beams (not shown). The pivots 66 permit the plenum tube to be pivoted or rocked about a transverse axis; i.e., an axis which is parallel to the longitudinal axis of the cylindrical tube 52, thereby to aim the nozzles 64 either forwardly or rearwardly of the gantry frame 10 and the vehicle in the treatment location, the particular direction of angular orientation being selected so as to drive air forwardly of the nozzles as they advance along the vehicle. An air cylinder 70 is connected between a bracket 72 on the longitudinal cross bar 24 and a bracket 74 welded to the plenum tube 52 to set the angularity of the plenum tube 52 in the nozzles 64 under the control of the processor in controller 18.

To explain the operation of the air cylinder 70 and the system for changing the angular relationship of the plenum tube 52 and the nozzle 64 in greater detail, it will be assumed that a vehicle in the treatment location beneath and within the gantry frame 10 has been fully washed and is ready to be dried. It will also be assumed that the gantry frame 10 is poised in a rest location toward the front of the vehicle and that the front of the vehicle is at the right as shown in FIG. 1. In this position, the first longitudinal trolley movement of the gantry frame 10 will be to the left; i.e. toward the rear of the vehicle being treated. As the motor 16 is activated to move the gantry frame 10 to the left, air cylinder 70 is also activated to rotate the plenum tube 52 to the left (clockwise) so that the nozzles 64 are aimed downwardly and to the left as shown in FIG. 1 to push water off of the surfaces of the vehicle in a forward sweeping or squeegee action. When the gantry frame 10 reaches its limit of travel, a limit switch 73 is closed and the direction of travel is reversed by the microprocessor in controller 18; i.e., the motor 16 is reversed and the air cylinder 70 is reversed to swing the plenum tube 52 to the right (counterclockwise) to again aim the nozzles forwardly of their own direction of movement.

Bumpers 58 are mounted to frame 10 by welding suitable brackets to the longitudinal cross beam 24 to prevent over-travel of the plenum tube 52 due to inadvertent contact with the vehicle or malfunction of the air cylinder 70.

Figure 3:
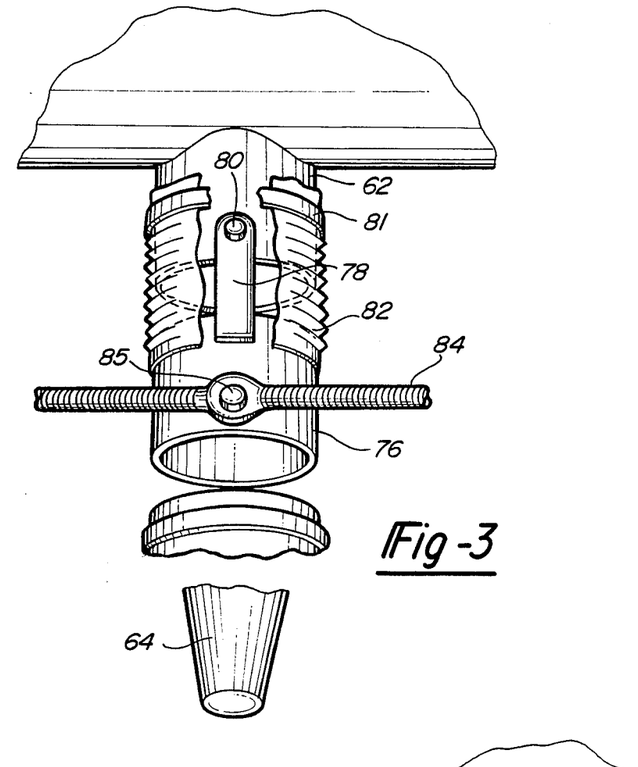
FIG. 3 is an exploded view showing details of the nozzle mounting and oscillation structure in the apparatus of FIGS. 1 and 2.
Figure 4:
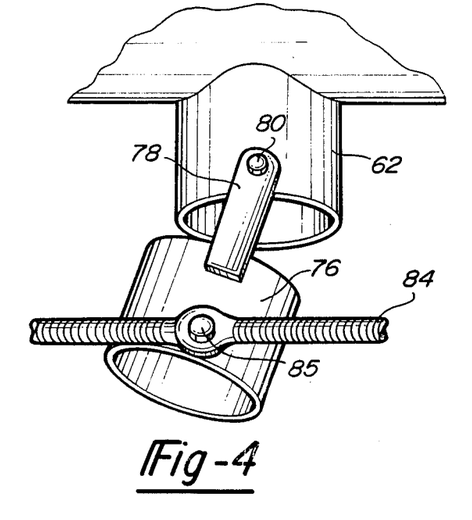
FIGS. 4 and 5 illustrate the nozzle structure of FIG. 3 in alternative pivotal locations.
Figure 5:
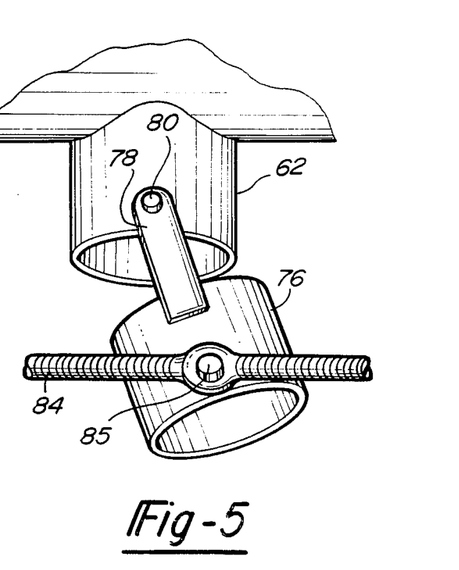

The rollover washer/dryer shown in FIGS. 1-5 of the patent drawing incorporates a second mechanism for altering the angularity of the nozzles 64 relative to the gantry frame 10 and a vehicle being treated in the location beneath and within the gantry frame 10. This mechanism is best shown in FIGS. 3, 4 and 5 to comprise a set of nozzle mounting collars 76 fabricated of a galvanized steel and of at least approximately the same diameter as the air outlet structures 62. The nozzle mounting collars 76 are pivotally connected to the outlet structures 62 as for example by means of galvanized steel straps 78 and pivot pins 80. A flexible, non-permeable tubing 82, such as flexible accordian-type rubber hosing, functions as a seal between the collars 76 and the cylindrical outlet structure 62. The flexible tubing 82 is held in place by means of clamps 81, and is sufficiently flexible to accommodate pivotal motion of the collars 76 relative to the outlet structure 62 as hereinafter described. The conical nozzles 64 are secured to the collars 76 by means of screws or other such conventional securing devices.

All of the nozzle mounting collars 76 in the arrangement shown in FIG. 2 are connected together in gang fashion by means of a threaded tie bar rod 84, connected to each of the collars 76 by means of a rod end bearing 85. The threaded tie bar rod 84 is connected to a gear box 86 which is driven by an electric motor 88 mounted on the plenum tube 52 near one end by suitable brackets as will be apparent to those skilled in the art. The gear box 86 drives a wheel 89 to which the threaded tie bar rod 84 is eccentrically connected such that rotation of the wheel 88 rocks or pivots the collars 76 to swing or oscillate the nozzles 64 transversely or laterally of the vehicle treatment location thereby to increase the effective coverage of the drying operation as the gantry frame 10 moves back and forth over the vehicle to be dried. Again the motor 88 is activated by the microprocessor in the controller 18. FIG. 4 shows the nozzle outlet structure with the fabric nozzles 64 and the flexible tube 82 removed. In FIG. 4 the threaded rod 84 has been shifted to the left to aim the air stream produced by the plenum tube 52 and the nozzle outlet structure to the left. In FIG. 5 threaded rod 84 has been shifted to the right to swing the air outlet structure to the right and change the angularity of the air stream relative to the surface of the vehicle. This operation may be repeated any number of times during the vehicle drying operation.

The dryer arrangement of FIGS. 1-5 generally does not have the benefit of a side drying structure and accordingly, the most outboard of the nozzles 64 are preferably somewhat outboard of the vehicle and are aimed slightly inwardly as best shown in FIG. 2 to provide coverage of the side surfaces, at least the windows of the vehicle in the treatment location.

Figure 6:
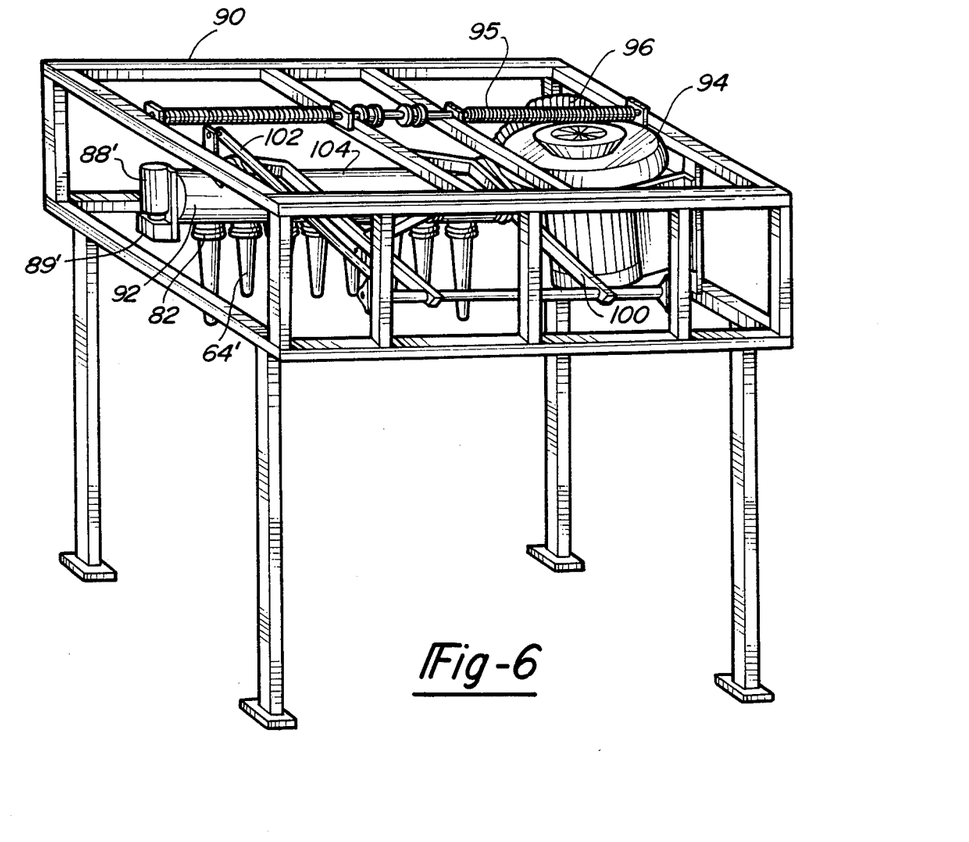
FIG. 6 is a perspective view of a free standing embodiment of the invention useful in conjunction with drive through washers or rollover type washers without automatic drying capabilities.

Referring now to FIG. 6, a second embodiment of the invention adapted primarily for use in drive through washers or rollover washers without automatic or semi-automatic drying capabilities as described above is disclosed. In a rollover washer, the vehicle is fixed in position and the washer is moved by means of a combination of trolley rails, wheels, drive motor and gear box. In this embodiment, after being washed in the rollover washer, the wet vehicle moves in a single direction, stopping when under the embodiment as shown in FIG. 6. The vehicle typically moves under its own power, eliminating the need and space for a conveyor or tire engaging pusher roller typical of tunnel washers.

The embodiment of FIG. 6 comprises a gantry frame 90 which may be identical to the gantry frame 10 shown in FIGS. 1 and 2 but which is adapted to be bolted or otherwise fixed in place and therefore does not employ the trolley rails 12, the wheels 14 or the drive motor and gear box combination 16 in the roll over washer embodiment of FIGS. 1 and 2. The gantry frame 90 of the embodiment of FIGS. 6 and 7 also carries a cylindrical galvanized steel plenum tube 92 connected to an air supply turbine 94 by means of flexible pipe 96 and having a plurality of spaced air outlet nozzles 64. The essential structure of the nozzles 64' may be identical to that shown in FIGS. 2-5 however the nozzles are permanently aimed downwardly and slightly toward the gantry structure 90; i.e., toward a vehicle which is advanced through the gantry structure 90 toward the plenum tube 92 so as to push the water or water beads rearwardly and outwardly relative to the longitudinal center line of the vehicle. The last outboard air outlet nozzles 64' are longer than the adjacent air outlet nozzles 64' so as to insure better drying of the sides of the vehicle.

The plenum tube 92 of the embodiment of FIG. 6 is not mounted structurally within the gantry bridge section as is the case with respect to the embodiment of FIGS. 1-5 and is not directly combined with a washing apparatus; i.e., the washing apparatus is stationed relative to the dryer gantry frame more toward the entry area of the washer system so that the vehicle is wetted, washed and rinsed before it reaches the dryer apparatus shown in FIG. 6.

Figure 8:
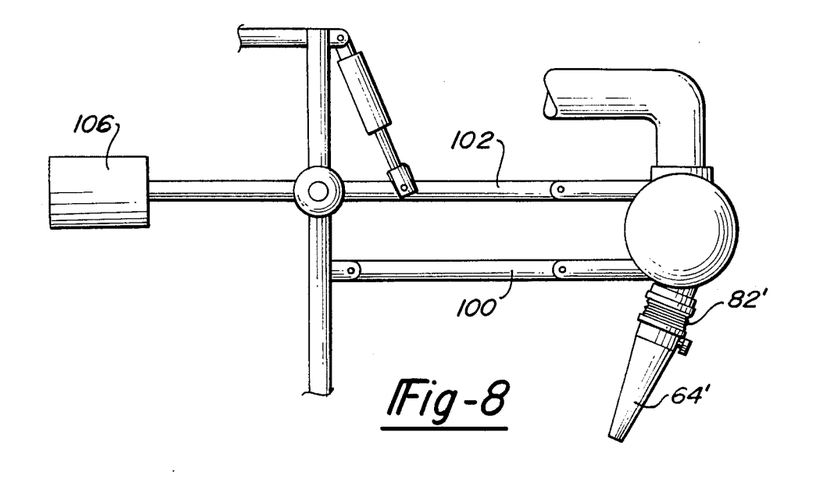
FIG. 8 is a side view of a portion of the apparatus of FIGS. 6 and 7 showing the suspension of the plenum over the vehicle drying location.

With this by way of background, the specific details of the embodiment of FIG. 6 will be described. Plenum tube 92 again is mounted over the vehicle drying location and runs transversely thereof so that the nozzles 64' are spaced transversely of the vehicle. Again the plenum tube 92 is preferably wider than the vehicle to be dried thereby to ensure a full coverage of any vehicle coming through the system. As shown in FIG. 8, the plenum tube 92 is mounted on parallelogram arms 100, 102 and 104 which are pivotally connected to the structural members of the gantry frame 90. Torsion springs 95 are used to neutralize the load represented by the plenum tube 92, the motor 88' and the nozzles 64' and permit on air cylinder (not shown) which is pivotally connected between the gantry frame 90 and the arms 100 and 104 to rapidly raise and lower the plenum tube 92 relative to a vehicle being treated. The torsion springs 95 are adjusted so that the plenum tube 92 and the associated structure go to the raised position in the event of a failure of the air cylinders or loss of power to the control system. As shown in FIG. 8, counterweights 106 may be used as alternatives to the torsion springs, in which case the counterweights 106 would slightly overbalance the load and raise the plenum tube 92 and the associated structure in the event of a failure of the air cylinders 110 or loss of power to the control system. The use of parallelogram arms ensures that the angular orientation of the plenum tube 92 and the associated nozzles 64' remain fixed regardless of the vertical position of the plenum tube 92 relative to the vehicle being treated. Electric eyes (not shown) may be used to regulate the position of the plenum 92 relative to the vehicle in a known manner.

The apparatus for oscillating or swinging the nozzle 64 in the embodiment of FIG. 6 is identical to that which is described above with respect to the embodiment of FIGS. 1-5 and identical but primed reference numerals are applied to like elements of structure. In particular, motor 88' is mounted at the far end of the plenum tube 92 in the embodiment of FIG. 6 and is connected to a tie bar (not shown) by means of the gearbox and a drive wheel 89' so as to oscillate the outlet direction of the nozzles relative to the plenum tube 92 in both transverse directions thereby to maximize the effectiveness and the effective coverage of the water stripper function.

Figure 7:
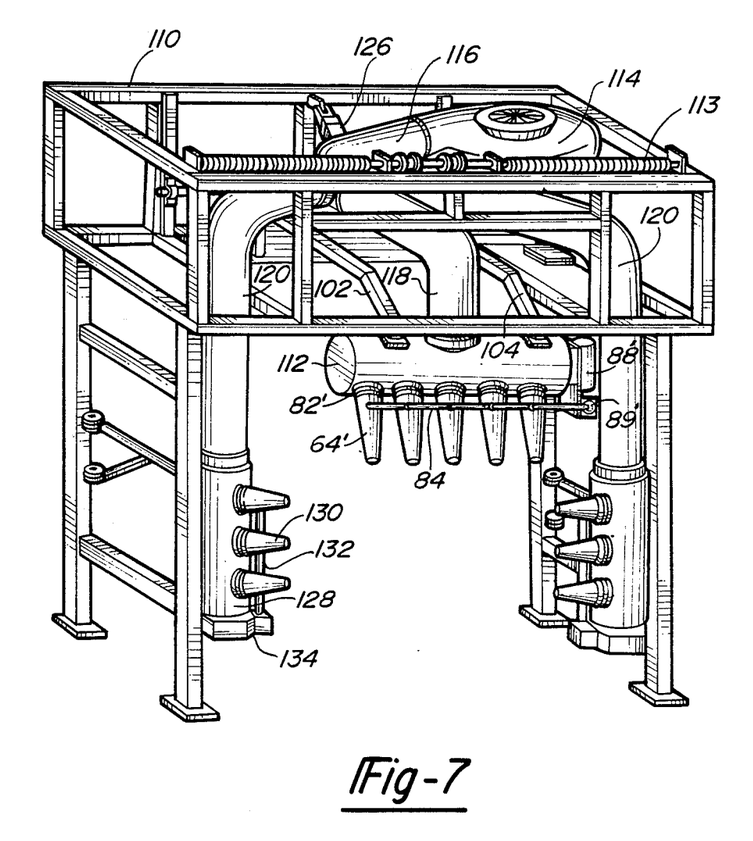
FIG. 7 is a perspective view of a freestanding embodiment of the invention useful in conveyor type tunnel washers.

Referring now to FIG. 7, a third embodiment of the invention adapted primarily for use in tunnel washers is disclosed. In a tunnel washer, the washing and drying apparatus is fixed in position and the vehicle is moved in a single direction through the apparatus, typically by means of a conveyor or a tire-engaging pusher roller which is mounted on an endless chain beneath the wheel track in a known manner.

The embodiment of FIG. 7 comprises a gantry frame 110 which may be identical to the gantry frame 10 shown in FIGS. 1 and 2 but which is adapted to be bolted or otherwise fixed in place and therefore does not employ the trolley rails 12, the wheels 14 or the drive motor and gear box combination 16 in the roll over washer embodiment of FIGS. 1 and 2. The gantry frame 110 of the embodiment of FIG. 7 also carries a cylindrical galvanized steel plenum tube 112 connected to an air supply turbine 114 by means of flexible pipe 118 and an air distributor 116 and having a plurality of spaced air outlet nozzles 64. The essential structure of the nozzles 64' may be identical to that shown in FIGS. 2-5 however, they are permanently aimed downwardly and slightly toward the gantry structure 110; i.e., toward a vehicle which is advanced through the gantry structure 110 toward the plenum tube 112 so as to push the water or water beads rearwardly and outwardly relative to the longitudinal center line of the vehicle.

The plenum tube 112 of the embodiment of FIG. 7 is not mounted structurally within the gantry bridge section as is the case with respect to the embodiment of FIGS. 1-5 and is not directly combined with a washing apparatus; i.e., the washing apparatus is stationed relative to the dryer gantry frame more toward the entry area of the tunnel washer system so that the vehicle is wetted, washed and rinsed before it reaches the dryer apparatus shown in FIG. 7.

With this by way of background, the specific details of the embodiment of FIG. 7 will be described. Plenum tube 112 again is mounted over the vehicle drying location and runs transversely thereof so that the nozzles 64' are spaced transversely of the vehicle. Again the plenum 112 is preferably wider than the vehicle to be dried thereby to ensure a full coverage of any vehicle coming through the system. As shown in FIG. 8, plenum tube 112 is mounted on parallelogram arms 100 and 102 similar to FIG. 7, which are pivotally connected to the structural members of the gantry frame 110. Torsion springs 113 are used to neutralize the load represented by the plenum tube 112, the motor 88' and the nozzles 64' and permit an air cylinder 126 which are pivotally connected between the gantry frame 110 and the arms 102 and 104 to rapidly raise and lower the plenum tube 112 relative to a vehicle being treated. The torsion springs 113 are adjusted so that the plenum tube 112 and the associated structure goes to the raised position in the event of a failure of the air cylinders 126 or loss of power to the control system. As shown in FIG. 8, counterweights 106 may be used as alternatives to the torsion springs, in which case the counterweights 106 would slightly overbalance the load and raise the plenum tube 112 and the associated structure in the event of a failure of the air cylinders 126 or loss of power to the control system. The use of parallelogram arms ensures that the angular orientation of the plenum tube 112 and the associated nozzles 64' remains fixed regardless of the vertical position of the plenum tube 112 relative to the vehicle being treated. Electric eyes (not shown) may be used to regulate the position of the plenum 112 relative to the vehicle in a known manner.

The apparatus for oscillating or swinging the nozzle 64' in the embodiment of FIG. 7 is identical to that which is described above with respect to the embodiment of FIGS. 1-5 and identical but primed reference numerals are applied to like elements of structure. In particular, motor 88' is mounted at the far end of the plenum tube 112 in the embodiment of FIG. 7 and is connected to a tie bar 84' by means of the gearbox and a drive wheel 89' so as to oscillate the outlet direction of the nozzles relative to the plenum tube 112 in both transverse directions thereby to maximize the effectiveness and the effective coverage of the water stripper function.

The embodiment of FIG. 7 may further comprise side mounted water strippers including substantially vertically mounted plenum tubes 128 having inwardly directed nozzles 130 which are identical in structure and function to the nozzles 64 and 64' which are spaced across and overhead of the drying location. The vertical galvanized steel plenum tubes 138 are connected to an air supply turbine 114 by means of flexible pipe 120 and an air distributor 116. The nozzles 114 in the side structure are oscillated in a vertical plane; i.e., up and down, relative to the side surfaces of the vehicle by means of a motor and gearbox combination 134 and a tie bar 132, thereby to maximize the effective coverage of the side drying arrangement. A second side drying arrangement identical to plenum tube 128 with nozzles 130 and motor 134 is located on the opposite side of the gantry frame 110.

The structure of FIG. 7 may be somewhat narrower at least in so far as the overall dimensions of the plenum tube 112 are concerned because the side drying structures are easily mounted within the gantry frame 110, this mounting arrangement being facilitated by the fact that there are no side brushes 48 in the free standing embodiment of FIG. 7.

We claim:

1. Apparatus for drying a washed vehicle in a vehicle drying location comprising:
   an elongate air plenum;
   support means disposing said plenum transversely across and over said vehicle drying location;
   a plurality of conical, fabric-like, flexible air outlet nozzles connected to and receiving air from said plenum and emitting said air downwardly against the surface of a wet vehicle in said location, said nozzles extending to, but spaced from the surface of said vehicle; and
   means carried by said support means for supplying air to said plenum.

2. Apparatus as defined in claim 1 wherein each nozzle has a central longitudinal outlet orifice of each of said nozzles is configured to emit air essentially parallel to said axis the apparatus further including means for altering the angular disposition of said nozzles relative to said wet vehicle.

3. Apparatus as defined in claim 1 wherein each nozzle has a central longitudinal axis, and the outlet orifice of each of said nozzles is configured to emit air essentially parallel to said axis, the apparatus further including means for altering the angular disposition of said nozzles relative to said plenum.

4. Apparatus as defined in claim 3 wherein said means for altering includes a plurality of nozzle mounting means connected to said plenum; and means for pivoting each of said mounting means about an axis parallel to the longitudinal axis of a vehicle in said location.

5. Apparatus as defined in claim 4 further including means for pivoting said plenum about an axis transverse to the longitudinal axis of a vehicle in said drying location thereby to reverse the direction of airflow over said vehicle as said plenum pivots in opposite directions.

6. Apparatus as defined in claim 1 further including means for pivoting said plenum relative to said support means about an axis transverse to a longitudinal axis of a vehicle in said drying location thereby to reverse the direction of airflow over said vehicle as said plenum pivots in opposite directions.

7. Apparatus as defined in claim 1 further including water spray means carried by said support means for wetting a vehicle in the drying location prior to operation of the air plenum.

8. Apparatus as defined in claim 7 further including means for causing longitudinal translation of said support means over said drying location in forward and reverse directions.

9. Apparatus as defined in claim 8 further including control means for operating said water spray means, said air supply and said translation means in sequence to perform washing and drying operations on said vehicle.

10. Apparatus as defined in claim 9 wherein said support means comprises a gantry frame having left and right spaced apart vertical side sections and a bridge section joining said side sections, said bridge section lying over and transversely of the drying location and carrying said plenum.

11. Apparatus as defined in claim 10 wherein said gantry frame is constructed of square-section tubing.

12. Apparatus as defined in claim 10 further including shielding means carried by said support for preventing water from collecting on said air plenum.

13. Apparatus as defined in claim 12 further including means for preventing water drippage from said air plenum and said bridge section onto a previously washed and dried vehicle.

14. Apparatus as defined in claim 1 further including first and second vehicle contacting brushes having horizontal axes of rotation and being pivotally mounted to the support means to extend in longitudinally opposite directions therefrom.

15. Apparatus for washing and drying a vehicle which remains in a fixed location as it is washed and dried comprising:
   means defining a roll-over support frame at least part of which overlies and extends across said location;
   means for translating said support frame forwardly and rearwardly along and over said location;
   vehicle washing means carried by said support frame;
   an elongate air plenum carried by said support frame transversely of the longitudinal axis of a vehicle in said location;
   means carried by said support frame for supplying air to said plenum; and
   a plurality of conical, flexible, fabric-like air outlet nozzles attached to said plenum at points spaced lengthwise therealong and extending therefrom to a point proximate to, but spaced from the surface of said vehicle for directing air from said plenum toward said vehicle in said location; each nozzle having a longitudinal axis, and the outlet orifice of each of said nozzles being configured so that air is emitted essentially parallel to said axis of said nozzle.

16. Apparatus as defined in claim 15 further including means for altering the angular disposition of said nozzles relative to said vehicle according to the direction of travel of said frame relative to said vehicle.

17. Apparatus as defined in claim 15 and further including means for altering the angular disposition of said nozzles relative to said plenum.

18. Apparatus as defined in claim 17 wherein the means for altering include a plurality of nozzle mounting means connected to said plenum and means for pivoting each of said mounting means about an axis parallel to the longitudinal axis of the vehicle in said location.

19. Apparatus as defined in claim 18 further including means for pivoting said plenum about an axis transverse to a longitudinal axis of a vehicle in said drying location thereby to reverse the direction of airflow over said vehicle as said plenum pivots in opposite directions.

20. Apparatus as defined in claim 15 further including means for pivoting said plenum relative to said support frame about an axis transverse to a longitudinal axis of a vehicle in said drying location.

21. Apparatus as defined in claim 20 further including control means for operating said vehicle washing means and said air supply means in sequence as the support frame translates longitudinally relative to the treatment location.

22. Apparatus as defined in claim 15 further including a pair of vehicle contacting brushes having horizontal axes of rotation, said brushes being pivotally connected by means of support arms to said support frame and extending in longitudinally opposite directions therefrom.

23. Apparatus as defined in claim 22 wherein said support frame comprises a gantry frame having vertical side sections and a transversely extending bridge section joining said side sections, said means for translating said support means comprising wheels connected to said gantry frame for attachment to parallel rails and a motor for driving at least one of said wheels in opposite directions.

24. Apparatus as defined in claim 15 further including shielding means carried by said support frame for preventing water from collecting on said air plenum.

25. Apparatus as defined in claim 24 further including means for preventing water drippage from said air plenum onto a previously washed and dried vehicle.

* * * * *

UNITED STATES PATENT AND TRADEMARK OFFICE
CERTIFICATE OF CORRECTION

PATENT NO. : 4,872,238
DATED : October 10, 1989
INVENTOR(S) : Lonnie Crotts

It is certified that error appears in the above-identified patent and that said Letters Patent is hereby corrected as shown below:

Column 9, line 44, delete "outlet orifice" and insert --axis, and the outlet orifice--.

Signed and Sealed this

Fifteenth Day of January, 1991

Attest:

HARRY F. MANBECK, JR.

*Attesting Officer*   *Commissioner of Patents and Trademarks*